Patented Aug. 21, 1945

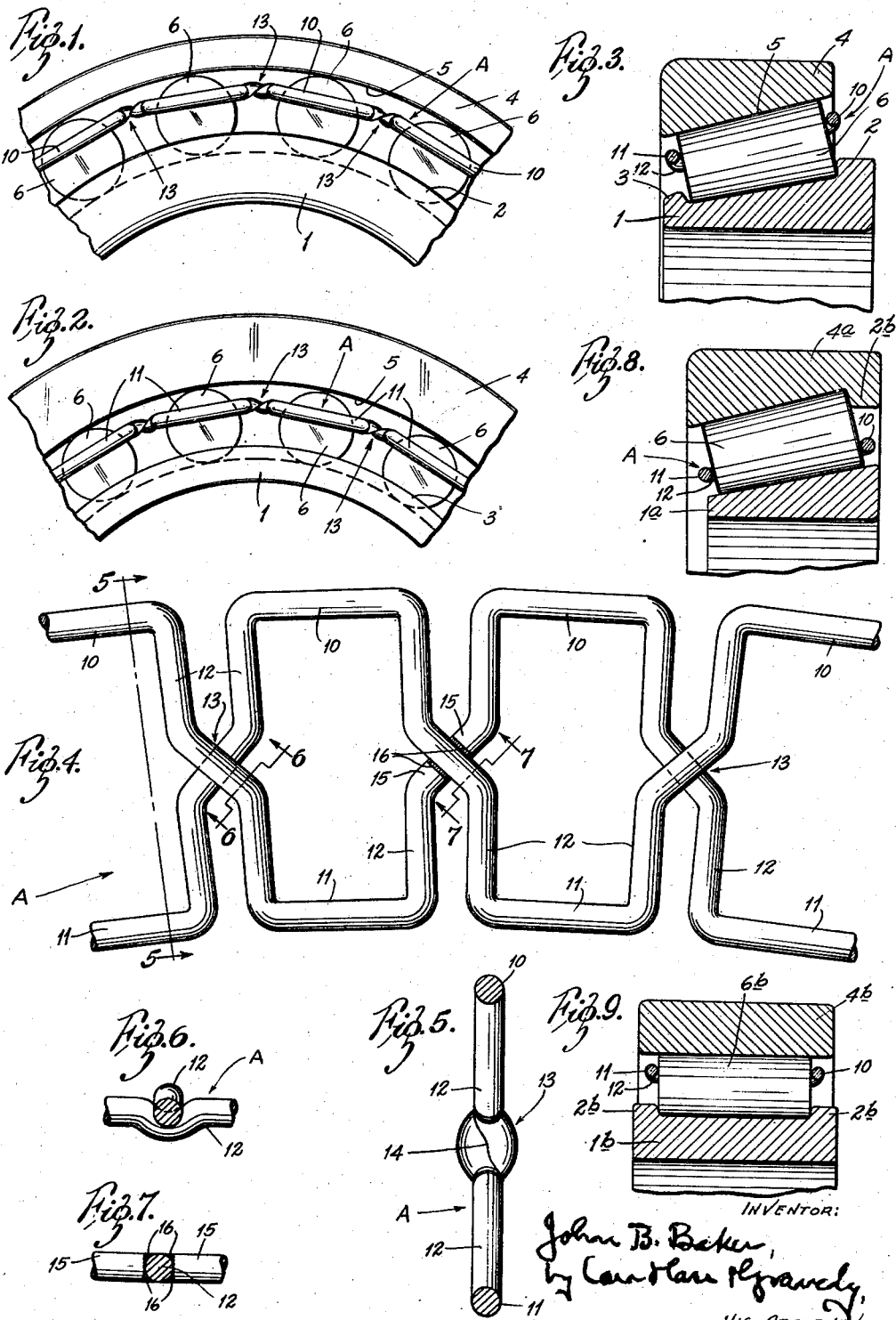

2,383,233

UNITED STATES PATENT OFFICE 2,383,233

CAGE FOR ROLLER BEARINGS

John B. Baker, Canton, Ohio, assignor to The Timken Roller Bearing Company, Canton, Ohio, a corporation of Ohio Application October 11, 1944, Serial No. 558,136

6 Claims. (Cl. 308—218)

My invention relates to cages for roller bearings, particularly tapered roller bearings. It has for its principal object a resilient cage with separate, spaced but interconnected pocket members for the individual rollers, the rollers being closely confined in said pockets and angular movement of the rollers being accommodated by movement of the pocket members with the rollers instead of by movement of the rollers in the pocket members. Other objects and advantages will appear hereinafter.

The invention consists principally in a cage made of a strip or strips of resilient wire bent around the several rollers of the bearing so as to closely confine each roller in a separate pocket member, adjacent pocket members being spaced apart but connected together, whereby individual movement of a pocket member is permitted to accommodate angular movement of its rollers. The invention further consists in the cage for roller bearings and in the parts and combinations and arrangements of parts hereinafter described and claimed.

In the accompanying drawing, wherein like reference characters indicate like parts wherever they occur.

Fig. 1 is a partial end view of the large end of a ribbed cone tapered roller bearing having a cage embodying my invention, Fig. 2 is a partial end view of the small end of such a bearing, Fig. 3 is a partial longitudinal sectional view, Fig. 4 is a developmental view of a portion of said cage on an enlarged scale, Fig. 5 is a sectional view on the line 5—5 in Fig. 4, Fig. 6 is a sectional view on the line 6—6 in Fig. 4, Fig. 7 is a sectional view on the line 7—7 in Fig. 4, Fig. 8 is a longitudinal section view similar to Fig. 3, showing a cage of my invention applied to a ribbed cup tapered roller bearing; and Fig. 9 is a longitudinal section view showing a cage of my invention applied to a straight or cylindrical type of roller bearing.

Figs. 1 to 7 illustrate a common type of tapered roller bearing comprising a cone 1 or inner bearing member having a thrust rib 2 at the larger end of its conical bearing surface and a retaining rib 3 at the smaller end thereof, a cup 4 or outer bearing member having a conical raceway 5 and tapered rollers 6 interposed therebetween. Fig. 8 illustrates a ribbed cup tapered roller bearing comprising a cone 1a, a cup 4a having a thrust rib 2b and tapered rollers 6 therebetween. Fig. 9 illustrates a common type of straight roller bearing comprising an inner bearing member 1b having ribs 2b, an outer bearing member 4b and cylindrical rollers 6b therebetween.

My invention is in a new type of cage, indicated generally by A for securing the rollers in assembled relation with respect to one of said bearing members, the bearing cone in the construction shown in Figs. 1 to 7. Said figures illustrate a bearing having an uneven number of rollers 6 and a cage A made from a single strip of resilient wire bent around the rollers to form pocket sections in which the rollers are closely confined.

Each individual pocket section comprises a portion or strip 10 extending across the large end of a roller in engagement therewith, a strip 11 extending across the small end of a roller in engagement therewith, side members or bridges 12 extending along portions of the sides of the roller in engagement therewith and cross-over portions 13 extending from one cage section to the other. The rollers 6 are thus closely held along their sides and ends.

In the construction illustrated in Figs. 1 to 7, the bearing has an odd number of rollers and the cage A is made of a single piece of wire. The bridges 12 extend from the large end strip 10 of one cage pocket along a portion of the length of the roller 6 and then along the side of an adjacent roller to the small end strip 11 of the adjacent pocket, the two portions of each bridge being connected by an angular cross-over portion 13, said cross-over being crimped to interfit with each other and, preferably being welded together, as indicated at 14.

The forming of the cage is begun at a cross-over and ends at the same cross-over, the free ends 15 of the wire strip being welded to the cross-over as at 16. In the case of a bearing having an even number of rollers, it will be necessary to use two separate strips leaving four ends to be welded together.

In the ribbed cone bearing shown in Figs. 1 to 7, the cage A is disposed radially outwardly of the center lines of the rollers 6 so as to hold the rollers in assembly on said cone. In the ribbed cup construction shown in Fig. 8, the cage is disposed radially inwardly of the center lines of the rollers 6 to hold the rollers in engagement with the cup 4a. In both of these constructions, the cage is of generally conical form, as required by the conical position of the rollers. The distance of the cage A from the center lines of the rollers 6 determines whether the rollers are in contact along their side edges, or are spaced apart.

Fig. 9 shows a straight roller bearing in which the cage is disposed radially outwardly of the center line of the rollers to hold them on the inner bearing member 1b.

The above cage has important advantages. It is economical in its use of material, utilizing the entire length of a strip of wire or the like, as contrasted with the considerable loss of material involved in stamping out pockets or openings in the solid blank from which cages are customarily made. The cage has sufficient resiliency and expansibility to permit it and the rollers to be snapped over the retaining rib on a bearing member, thus eliminating the usual bridge bowing operation and subsequent closing-in operation required in the case of cages having solid end rings and connecting bridges. The pocket sections closely engage the rollers and thus assist the guiding action of the thrust rib on the rollers and minimize the tendency of the rollers to move angularly out of position as they leave the loaded zone of the bearing. Necessary angular or other movement of an individual roller with reference to other rollers is accommodated by movement of a portion of the cage itself rather than by the usual method of movement of the individual roller in an oversize pocket.

Obviously the material of the cage may be selected to give the degree of resilience and yieldability required in any particular case and the wire or other material may be of circular, oval, square, oblong, or any other desired cross-sectional shape. Obviously, numerous other changes may be made without departing from the invention and I do not wish to be limited to the precise construction shown.

What I claim is:

1. A cage for a roller bearing comprising a resilient strip shaped to form separate but interconnected sections constituting individual roller pockets, each section comprising end members each forming one end of a roller pocket and side or bridge members, each of said bridge members having a portion extending along a portion of a side of one roller pocket, a cross-over portion and a portion extending along a portion of one side of an adjacent roller pocket, whereby said sections are spaced apart to accommodate movement of individual rollers and are restored to normal position by the resilience of the cage.

2. A cage for a roller bearing comprising a resilient strip shaped to form separate but interconnected sections constituting individual roller pockets, each section comprising end members each forming one end of a roller pocket and side or bridge members, each of said bridge members having a portion extending along a portion of a side of one roller pocket, a cross-over portion extending from said pocket to an adjacent pocket and a portion extending along a portion of one side of said adjacent roller pocket, the cross-over portions of adjacent bridges being secured together, whereby said sections are spaced apart to accommodate movement of individual rollers and are restored to normal position by the resilience of the cage.

3. A cage for a roller bearing comprising a resilient strip shaped to form separate but interconnected sections constituting individual roller pockets, each section comprising end members each forming one end of a roller pocket and side or bridge members, each of said bridge members having a portion extending along a portion of a side of one roller pocket, a cross-over portion extending from said pocket to an adjacent pocket and a portion extending along a portion of one side of said adjacent roller pocket, the cross-over portions of adjacent bridges being welded together, whereby said sections are spaced apart to accommodate movement of individual rollers and are restored to normal position by the resilience of the cage.

4. A cage for a roller bearing comprising a resilient strip shaped to form separate but interconnected sections constituting individual roller pockets, each section comprising end members each forming one end of a roller pocket and side or bridge members, each of said bridge members having a portion extending along a portion of a side of one roller pocket, a cross-over portion and a portion extending along a portion of one side of an adjacent roller pocket, said end members and bridge members closely confining the individual rollers, said cross-over portions being welded together, whereby said sections are spaced apart to accommodate movement of individual rollers and are stored to normal position by the resilience of the cage.

5. A cage for a taper roller bearing comprising a resilient strip shaped to form separate but interconnected sections constituting individual roller pockets, each section comprising end members each forming one end of a roller pocket and side or bridge members, each of said bridge members having a portion extending from an end member at the smaller end of a roller pocket along a portion of a side of one roller pocket, a cross-over portion and a portion extending along a portion of one side of an adjacent roller pocket to the end member at the larger end of said adjacent roller pocket, whereby said sections are spaced apart to accommodate movement of individual rollers and are restored to normal position by the resilience of the cage.

6. A cage for a taper roller bearing comprising a resilient strip shaped to form separate but interconnected sections constituting individual roller pockets, each section comprising end members each forming one end of a roller pocket and side or bridge members, each of said bridge members having a portion extending from an end member at the smaller end of a roller pocket along a portion of a side of one roller pocket, a cross-over portion and a portion extending along a portion of one side of an adjacent roller pocket to the end member at the larger end of said adjacent roller pocket, said cross-over portions being secured together, whereby said sections are spaced apart to accommodate movement of individual rollers and are restored to normal position by the resilience of the cage.

JOHN B. BAKER.